(12) United States Patent
Kaukovirta-Norja et al.

(10) Patent No.: US 9,433,236 B2
(45) Date of Patent: Sep. 6, 2016

(54) METHOD FOR FRACTIONATING OAT, PRODUCTS THUS OBTAINED, AND USE THEREOF

(75) Inventors: Anu Kaukovirta-Norja, Espoo (FI); Olavi Myllymäki, Espoo (FI); Heikki Aro, Jokioinen (FI); Veli Hietaniemi, Jokioinen (FI); Juha-Matti Pihlava, Jokioinen (FI)

(73) Assignee: VALTION TEKNILLINEN TUTKIMUSKESKUS, Espoo (FI)

( * ) Notice: Subject to any disclaimer, the term of this patent is extended or adjusted under 35 U.S.C. 154(b) by 763 days.

(21) Appl. No.: 12/526,470

(22) PCT Filed: Feb. 7, 2008

(86) PCT No.: PCT/FI2008/050049
§ 371 (c)(1),
(2), (4) Date: Aug. 7, 2009

(87) PCT Pub. No.: WO2008/096044
PCT Pub. Date: Aug. 14, 2008

(65) Prior Publication Data
US 2010/0092651 A1    Apr. 15, 2010

(30) Foreign Application Priority Data
Feb. 8, 2007    (FI) .................................... 20075090

(51) Int. Cl.
*A23D 7/00*    (2006.01)
*B09B 3/00*    (2006.01)
(Continued)

(52) U.S. Cl.
CPC . *A23L 1/10* (2013.01); *A23D 9/00* (2013.01); *A23J 1/12* (2013.01); *A23L 1/308* (2013.01); *C08B 30/042* (2013.01); *C11B 1/104* (2013.01); *Y02P 20/544* (2015.11)

(58) Field of Classification Search
CPC ........... A23D 9/00; A23J 1/12; C11B 1/104; A23L 1/308; A23L 1/10; C08B 30/042
USPC ....... 426/607, 655; 530/300; 536/123.12, 45
See application file for complete search history.

(56) References Cited

U.S. PATENT DOCUMENTS 4,028,468 A     6/1977   Hohner et al.
5,312,636 A *   5/1994   Myllymaki et al. .......... 426/417
(Continued)

FOREIGN PATENT DOCUMENTS

FI           113938 B      4/2001
WO       WO-01/26479 A1    4/2001
(Continued)

OTHER PUBLICATIONS

Aro, H; Jarvenpaa, E; Konko, K; Huopalahti, R; and Hietaniemi V. The characterisation of oat lipids produced by supercritical fluid technologies. Nov. 3, 2006. [Online]. Downloaded from: <URL: http://www.sciencedirect.com/science/article/pii/S0733521006001251>.*
(Continued)

*Primary Examiner* — Michele L Jacobson
*Assistant Examiner* — Subbalakshmi Prakash
(74) *Attorney, Agent, or Firm* — Birch, Stewart, Kolasch & Birch, LLP

(57) ABSTRACT

The invention relates to a method of preparing functionally valuable products, such as β-glucan, protein, starch and lipid concentrates from oat. The invention also relates to products thus obtained and to the use thereof. The invention further relates to the use of non-heat-treated or slightly heat-treated oat fat-extracted with supercritical extraction for preparing said products by using dry milling, sieving and air classification.

26 Claims, 1 Drawing Sheet

$CO_2$ extraction efficiency on oat heat-treated in different manners

(51) Int. Cl.
*C07H 1/00* (2006.01)
*C08B 11/193* (2006.01)
*A23L 1/10* (2006.01)
*A23D 9/00* (2006.01)
*A23J 1/12* (2006.01)
*A23L 1/308* (2006.01)
*C08B 30/04* (2006.01)
*C11B 1/10* (2006.01)

(56) References Cited

U.S. PATENT DOCUMENTS

| | | | |
|---|---|---|---|
| 5,725,901 A | | 3/1998 | Fox |
| 6,083,547 A | * | 7/2000 | Katta et al. .................. 426/443 |
| 2003/0087019 A1 | * | 5/2003 | Malkki et al. ................ 426/618 |
| 2004/0101935 A1 | * | 5/2004 | Vasanthan et al. ........... 435/101 |
| 2005/0153044 A1 | | 7/2005 | Hellweg et al. |

FOREIGN PATENT DOCUMENTS

| WO | WO-2004/096242 A1 | 11/2004 |
|---|---|---|
| WO | WO-2005/120251 A1 | 12/2005 |
| WO | WO-2005/122785 A1 | 12/2005 |

OTHER PUBLICATIONS

Properties of defatted and pin-milled oat bran concentrate fractions separated by air classification Meeting Abstract, AACC, World Grains Summit, Foods & Beverages, San Francisco, USA.*

Y. Victor Wu and Arthur C Stringfellow Enriched Protein and beta-Glucan fractions from high-protein oats by air classification. Cereal Chem. 72(1):132-134, 1995.*

Aro, Heikki; Javerpaa, Eila; Konko, Karolina; Huopalahti, Rainer, Hietaniemi, Veli. The charactrisation of oat lipids produced by supercritical fluid technologies. Journal of Cereal Science 45 (2007) 116-119, online Nov. 3, 2006.*

Pekka Lehtinen , Katja KiiliaĖinen, Ilkka LehtomaĖki and Simo Laakso Effect of Heat Treatment on Lipid Stability in Processed Oats Journal of Cereal Science 37 (2003) 215-221.*

Handreck et al., "Beta-Glucananreicherung in Gerstenmahlprodukten durch Prallvermahlung," Getreide Mehl und Brot, Bochum, vol. 51, No. 3, Jan. 1, 1997, pp. 158-161.

Search Report issued Feb. 16, 2011, in European Patent Application No. 08709317.

Vorwerck, "Hafermahlprodukte mit erhohtem Ballaststoffgehalt," Getreide Mehl und Brot, Bochum, DE, Jan. 1, 1999, pp. 265-266.

Stevenson et al., Properties of defatted and pin-milled oat bran concentrate fractions separated by air classification, World Grains Summit: Food and Beverages, Sep. 17-20, 2006, Poster P-310.

Aro et al., "The characterisation of oat lipids produced by supercritical fluid technologies", Journal of Cereal Science vol. 45, 2007, pp. 116-119.

Wu et al., Enrichment of β-glucan in Oat Bran by Fine Grinding and Air Classification, Lebensmittel.-Wiss. u. Technol, vol. 35, pp. 30-33, 2002.

Wu et al., Enriched Protein- and β-Glucan Fractions form High-Protein Oats by Air Classification, Cereal Chemistry, 1995, vol. 72, No. 1, pp. 132-134.

Knuckles et al., "β-Glucan Enriched Fractions from Laboratory-Scale Dry Milling and Sieving of Barley and Oats1,2", Cereal Chemistry, 1992, vol. 69, No. 2, pp. 198-202.

Stevenson et al., "Structure and physicochemical properties of defatted and pin-milled oat bran concentrate fractions separated by air-classification4", International Journal of Food Science and Technology, 2008, vol. 43, pp. 995-1003.

Konko et al., "The production of oats lipids by supercritical fluid technologies", Proceedings 7th International Oat Conference, Agrifood research Reports, 51, 2004, p. 130.

Fors et al., "Characterization of Oils Extracted from Oats by Supercritical Carbon Dioxide", Lebensmittel-Wissenschaft and Technologie, 1990, vol. 23, pp. 390-395.

* cited by examiner

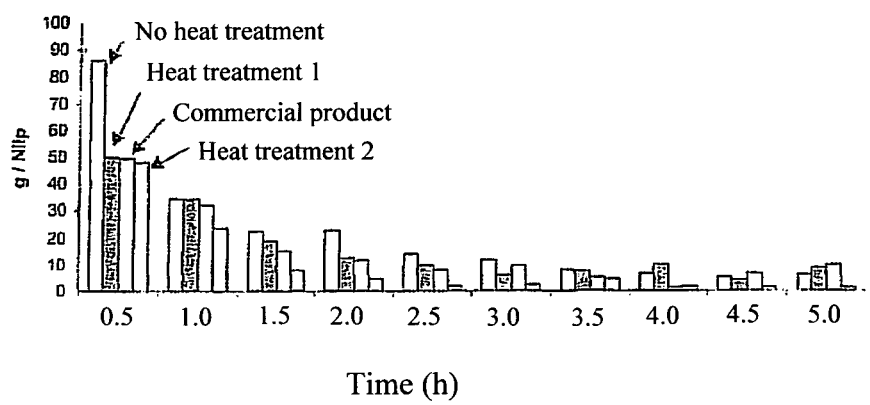
CO$_2$ extraction efficiency on oat heat-treated in different manners

METHOD FOR FRACTIONATING OAT, PRODUCTS THUS OBTAINED, AND USE THEREOF

BACKGROUND OF THE INVENTION

The invention relates to a method of preparing functionally valuable products, such as β-glucan, protein, starch and lipid concentrates, from oat. The invention also relates to products thus obtained and to the use thereof. The invention further relates to the use of non-heat-treated or slightly heat-treated oat, fat-extracted with supercritical extraction, in preparing β-glucan, protein and starch concentrates.

Oat is known to contain functionally valuable components, one of which is its important fibre component, β-glucan. β-Glucan has been found to possess, inter alia, a cholesterol-reducing effect that is also positive as regards weight control. In addition, oat also contains other functionally valuable components, such as proteins, starch and lipids, which find use in the food industry, the pharmaceutical industry and cosmetics.

Publications B. E. Knuckles et al., "β-Glucan-Enriched Fractions from Laboratory-Scale Dry Milling and Sieving of Barley and Oats", Cereal Chemistry, 69(2), 1992, p. 198 to 202 and Y. V. Wu & D. C. Doehlert, "Enrichment of β-glucan in Oat Bran by Fine Grinding and Air Classification", Lebensmittel.-Wiss. u. Technol., 35, 2002, p. 30 to 33 disclose the preparation of β-glucan-containing fractions from oat and barley by using dry processes, such as milling, sieving and classification. The starting material used is oat, which is at least partly defatted by solvent treatment (n-hexane). This treatment yielded oat fractions having a β-glucan content of at most about 28%. The disadvantage of solvent treatment is that it usually has a denaturing effect on oat proteins and other functionally valuable components. Solvent residues and safety also present problems.

Publication U.S. Pat. No. 6,797,307 B2 (Mälkki et al., Avena Oy) discloses a method for preparing a β-glucan-containing oat fraction by milling and classifying from non-defatted oat (fat content 6 to 7%). The oat used as starting material is heat-treated or heat-stabilized. The publication claims that the method is usable for preparing β-glucan concentrates having a β-glucan content of up to 25%. Heat treatment may have a denaturing effect on the functionally valuable components of oat. The presence of fat, in turn, may have a harmful effect on the shelf life of the products.

Publications U.S. Pat. No. 6,323,338 B1 (Potter et al., Nurture Inc.), WO 2005/120251 A1 (Löv et al., Oy Glubikan Ab), WO 2004/096242 (Redmond & Fielder, Ceapro Inc.), US 2004/0101935 A1 (Vasanthan & Temelli) and WO 2005/122785 A1 (Kvist & Lawther, Biovelop International B.V.) disclose solvent-based methods for preparing β-glucan concentrates from plant material, such a cereal grain, including oat and barley. The β-glucan content of these β-glucan concentrates is higher than that obtained by dry methods, about 87% (U.S. Pat. No. 6,323,338) or 92% (WO 2004/096242), for example. Aqueous solutions or organic solvents, such as ethanol, or combinations of water and organic solvents, for example, are used as solvents. In these methods, β-glucan is usually dissolved in an aqueous solution and recovered therefrom by precipitation, filtering and drying, by membrane techniques or other suitable manners. The preparation of concentrates generally requires plenty of water and/or solvents and much energy required by the drying. In addition, the use of solvents may have a harmful effect on the properties of the product.

An oat fibre preparation (manufacturer Swedish Oat Fiber Kb, distributor Creanutrition) containing 22% β-glucan is also commercially available. It is prepared from heat-treated oat bran or oatmeal by extracting fat with ethanol, whereby the fat content of the finished, enriched fibre is about 4%.

BRIEF DESCRIPTION OF THE INVENTION

The object of the invention is to provide a method of preparing functionally valuable products from oat without having to use complicated wet methods, such as solvent extraction or heat treatments, which harmfully affect the properties of oat. The invention aims at maintaining the properties of oat and, at the same time, the molecular weights and other properties of the desired valuable components as natural as possible. The object of the invention is achieved with a method and products, which are characterized by what is disclosed in the independent claims. Preferred embodiments of the invention are described in the dependent claims.

The invention is based on defatting non-heat-treated or slightly heat-treated oat by using supercritical extraction, followed by dry-milling of the oat to a suitable particle size and separating, therefrom, fractions having deviating compositions and properties by using dry methods, such as sieving and air classification.

BRIEF DESCRIPTION OF THE DRAWING

FIG. 1 shows results for extracting oat in different manners that are heat-treated and non-heat-treated.

DETAILED DESCRIPTION OF THE INVENTION

The invention thus relates generally to a method of preparing functionally valuable products, such as β-glucan, protein, starch and lipid concentrates from oat by subjecting non-heat-treated or slightly heat-treated oat to fat extraction with a fluid in a supercritical state, typically with $CO_2$ and/or a combination of $CO_2$ and EtOH, and by separating β-glucan, protein and starch concentrates from the thus obtained fat-extracted oat by using mechanical dry methods, such as milling, sieving and air classification. If desired, a fat fraction or fat fractions obtained from the supercritical extraction and comprising a lipid concentrate (lipid-enriched oat oil) are also recovered.

The invention relates particularly to a method of preparing β-glucan, protein, starch and lipid concentrates from oat, the method comprising the following steps of:

(a) extracting non-heat-treated or slightly heat-treated oat with a fluid in a supercritical state, whereby a fat-extracted oat fraction and one or more fat fractions are obtained, (b) dry-milling the fat-extracted oat fraction by impact milling into oatmeal having such a particle size that at least 95% of the particles are between 1.0 and 3,000 μm calculated on the basis of the volume, (c) dividing the thus obtained oatmeal into a first coarse fraction and a first fine fraction, said first coarse fraction comprising a β-glucan concentrate having a β-glucan content of 12 to 50%, preferably 30 to 40%, and said first fine fraction comprising a starch concentrate having a starch content of more than 65%, preferably more than 70%, and said division being performed by using one or more operations selected from sieving and air classification and, optionally, dry milling, (d) dividing said first fine fraction further by sieving or air classification into a second coarse fraction, a second fine fraction and a third fine fraction, said second coarse fraction comprising a β-glucan concentrate having a β-glucan content of 25 to 60%, preferably 45 to 60%, said second fine fraction comprising a starch concentrate having a starch content of more than 80%, and said third fine fraction comprising a protein concentrate having a protein content of more than 30%, preferably 50 to 80%.

The method of the invention comprises as a first step (a) the extraction of oat with a fluid in a supercritical state, the fluid typically being carbon dioxide and/or a combination of carbon dioxide and ethanol. When a combination of carbon dioxide and ethanol is used, the proportion of ethanol may be 8 to 10%, for example. In supercritical extraction, fat is removed from oat, yielding a fat-extracted oat fraction and one or more fat fractions. The fat content of the fat-extracted oat fraction is less than 3.5%, preferably less than 2.5%, more preferably less than 1%. The use of ethanol together with carbon dioxide improves the separation of polar lipids, such as phospholipids and glycolipids together with triglycerides.

In an embodiment of the invention, the extraction is performed in two steps by first performing the extraction with carbon dioxide and then with a combination of carbon dioxide and ethanol. In a preferred embodiment of the invention, the extraction is performed in one step with a combination of carbon dioxide and ethanol.

In supercritical extraction, peeled oat is used as starting material, preferably in a flattened form, such as flake or bran. The most preferable form is thin, flaky bran. The oat is in a non-heat-treated or slightly heat-treated form. In the context of the present invention, a slight heat treatment refers to a heat treatment that does not result in any measurable changes in the starch and proteins of the oat. The following conditions are typically used: temperature at most 100° C. and relative humidity at most 16%. Treatment time is typically less than 30 minutes.

The use of non-heat-treated or slightly heat-treated oat as starting material brings forth the advantage that oat proteins and other valuable components remain in their native form and do not become denatured, which denaturation complicates milling and classification operations. In the extracted bran, residual fat is in a stable form, and no harmful hydrolysis occurs therein.

Supercritical extraction is carried out by using temperature and pressure conditions wherein the extraction fluid used is in a supercritical state. The extraction temperature is typically within the range 32 to 90° C., for instance 70° C., and the extraction pressure is typically within the range 120 to 600 bar, for instance 450 bar. The extraction time varies between 2 and 8 h, and it may be 4 to 5 h, for example. The water content of oat in extraction is typically within the range 9 to 14%, which corresponds to the inherent moisture of oat. Under these conditions, oat proteins become significantly less denatured than generally in the industrial heat treatment of grain. This is a significant advantage, since is facilitates the separation of the fractions in the air classification and sieving subsequent to the milling.

It was surprisingly found out that the extraction speed of fat was better when non-heat-treated oat was used as the starting material than with heat-treated oat.

From supercritical extraction, a fat-extracted oat fraction and one or more fat fractions are obtained.

The fat-extracted oat fraction thus obtained is divided by mechanical dry methods, such as dry milling, sieving and air classification into different functionally valuable products.

The milling, sieving and air classification steps are typically carried out when the moisture of the oat is 9 to 13%, preferably 10 to 11%. This generally corresponds to the inherent moisture of oat in a normal treatment temperature (about room temperature). If desired, moisture may also be added to the oat.

The fractionating of fat-extracted oat comprises, as the first step, dry milling of the fat-extracted oat by impact milling (step b of the method of the invention). In the impact milling, a pin mill or mills provided with grinding discs or mills provided with a sieve may be used, for example. The milling may be performed in one or more steps. Oatmeal is obtained, having such a particle size that at least 95% of the particles are between 1.0 and 3,000 µm calculated on the basis of the volume.

In step (c) of the method of the invention, the oatmeal thus obtained is divided into a first coarse fraction and into a first fine fraction, whereby said coarse fraction comprises a β-glucan concentrate having a β-glucan content of 12 to 50%, preferably 30 to 40%, and said fine fraction comprises a starch concentrate having a starch content of more than 65%, preferably more than 70%.

In step (c) of the method of the invention, said division is carried out by using one or more operations selected from sieving and air classification and, if desired, from dry milling. In air classification, the process parameters are preferably the following: rotation speed of the classifier wheel of the air classification device is about 20 to 100% of the maximum rotation speed of the classifier, and the air flow of the air classification device is 40 to 100% of the maximum air flow of the classifier. The sieve size used in the sieving is typically in the range 20 to 150 µm, preferably 25 to 50 µm.

The essential components comprised by the air classification device used in the method of the invention are a classifier chamber, a cyclone, a collector vessel and a filter following the cyclone. A coarse fraction of the classification is recovered from the collector vessel and the finest fraction from the filters.

In an embodiment of the invention, step c) includes a plurality of steps, whereby the coarse fraction of the first sieving or air classification is milled and sieved or air-classified again, whereby β-glucan is further enriched to a coarse fraction of said second sieving or air classification, which has a β-glucan content of 12 to 50%, preferably 30 to 40%.

In one such embodiment of the invention, step (c) includes an additional milling, allowing the method to be carried out in the following manner: the oatmeal obtained from step (b) is sieved with a sieve having a sieve size of 75 to 150 µm, and the coarse fraction remained on the sieve is recovered, a fraction including mainly cell walls of the endosperm and the aleurone and subaleurone parts, in which the β-glucan and protein are enriched and which includes much aleurone and subaleurone part of the oat grain. This coarse fraction is re-milled, either by impact milling or preferably by grinding milling, and the thus obtained powder is divided by sieving (sieve size 20 to 150 µm, preferably 25 to 50 µm) or by air classification into a coarse fraction and a fine fraction, yielding the first coarse fraction and the first fine fraction according to step (c) of the method of the invention.

The β-glucan concentrate obtained as the first coarse fraction typically has the following characteristics:
β-glucan content is 12 to 50%, preferably 30 to 40%,
protein content is 20 to 35%,
starch content is at most 15%, preferably at most 10%, fat content is less than 3.5%, preferably less than 2%, and
volume-average particle size is 160 to 280 µm, and at least 95% of the particles are within the range 35 to 1,000 µm.

The β-glucan of the first coarse fraction originates mainly from the aleurone layer (peel layer) of the oat grain.

The starch concentrate obtained as the first fine fraction typically has the following characteristics:
starch content is more than 65%, preferably more than 70%,
protein content is 10 to 25%,
fat content is less than 2.5%, preferably less than 1%, and
volume-average particle size is 4 to 80 µm and at least 95% of the particles are between 1 and 800 µm.

In the next step (d) of the method of the invention, said first fine fraction is further divided by sieving or air classification into a second coarse fraction and a second fine fraction and into a third fine fraction. When sieving is used, the aperture size of the sieve is typically 10 to 150 µm, preferably 25 to 50 µm. Sieving may be performed for instance as an air jet sieving, whereby an aperture size of 20 to 100 µm is typically used. Air classification may also be used. In air classification, the rotation speed of the classifier is typically 20 to 100% of the maximum rotation speed of the classifier and the airflow of the classifier is 40 to 100% of the maximum airflow of the classifier.

As said second coarse fraction, a β-glucan concentrate is obtained, whose β-glucan content is 25 to 60%, preferably 45 to 60%. As said second fine fraction, a starch concentrate is obtained, whose starch content is more than 80%. As said third fine fraction, a protein concentrate is obtained, whose protein content is more than 30%, preferably 50 to 80%.

In an embodiment of the invention, when air classification is used in step (d), said second coarse fraction (β-glucan concentrate) is recovered from the collector vessel of the classifier, said second fine fraction (starch concentrate) from the cyclone and said third fine fraction (protein concentrate) from the filter after the cyclone.

The characteristics of the β-glucan concentrate obtained as the second coarse fraction are the following:
β-glucan content is 25 to 60%, preferably 45 to 60%,
protein content is 15 to 25%,
starch content is less than 20%, preferably less than 10%,
fat content is less than 3.0%, preferably less than 2%, and
volume-average particle size is 80 to 120 µm, and at least 95% of the particles are between 20 and 500 µm,
it is a light, almost white powder.

The β-glucan in said second coarse fraction originates mainly from the endosperm part of the oat grain.

Said β-glucan concentrates contain about 85 to 95% of the β-glucan of the fine fraction of the oat, the fine fraction being mainly composed of the endosperm part of the grain.

The characteristics of the starch concentrate obtained as the second fine fraction are the following:
starch content is more than 80%,
protein content is less than 15%, preferably less than 10%,
fat content is less than 2.5%, preferably less than 1%, and
volume-average particle size is 12 to 15 µm and at least 95% of the particles are between 1.0 and 210 µm.

Said third fine fraction comprises a protein concentrate having a protein content of more than 30%, preferably 50 to 80%. It is mainly conveyed to the filter after the cyclone of the air classification device.

In an embodiment of the invention, the separation of the third fine fraction may be performed by using sieving, whereby the aperture size of the sieve is 10 to 50 µm.

The characteristics of the protein concentrate obtained as the third fine fraction are the following:
protein content is more than 30%, preferably 50 to 80%,
fat content is less than 5.0%, preferably less than 3%, and
volume-average particle size is 1 to 5 µm and at least 95% of the particles are between 0.5 and 7 µm.

In addition, in the method of the invention, a fat fraction, of which there may be one or more, obtained from the supercritical extraction is recovered.

When only carbon dioxide is used in the supercritical extraction, a lipid concentrate containing more than 90% neutral fats, which are mainly triglycerides, is obtained as the fat fraction. This lipid concentrate contains about 80% of the fats of the oat.

When a combination of carbon dioxide and ethanol is used in the supercritical extraction, as the fat fraction a lipid concentrate is obtained containing about 20% of the fats of the oat and having the following characteristics:
triglyceride content is 60 to 80%, typically about 70%,
phospholipid content is 10 to 15%, typically about 12%,
glycolipid content is about 15 to 25%, typically about 18%.

When the supercritical extraction is performed in two steps, first with carbon dioxide and then with a combination of carbon dioxide and ethanol, as the fat fraction a lipid concentrate is obtained containing more than 90% polar lipids preferably comprising 35 to 50%, typically about 40% phospholipids, and preferably 50 to 70%, typically about 60% glycolipids.

The invention further relates to β-glucan, starch, protein and lipid concentrates obtained by the method.

The invention also relates to an oat-based β-glucan concentrate having the following characteristics:
β-glucan content is 12 to 50%, preferably 30 to 40%, and it is mainly composed of β-glucan of the oat aleurone,
protein content is 20 to 35%,
starch content is at most 15%, preferably at most 10%,
fat content is less than 3.5%, preferably less than 2%,
volume-average particle size is 160 to 280 µm, and at least 95% of the particles are between 35 and 1,000 µm.

The invention also relates to an oat-based β-glucan concentrate having the following characteristics:
β-glucan content is 25 to 60%, preferably 45 to 60%, and it is mainly composed of β-glucan of the oat endosperm,
protein content is 15 to 25%,
starch content is less than 20%, preferably less than 10%,
fat content is less than 3.0%, preferably less than 2%,
volume-average particle size is 80 to 120 µm, and at least 95% of the particles are between 20 and 500 µm,
it is a light, almost white powder.

The expression 'mainly' above means that at least 50% of the β-glucan of said concentrates originates from the β-glucan of the aleurone or endosperm, respectively, of the oat grain.

The invention further relates to an oat-based starch concentrate having the following characteristics:
its starch content is more than 65%, preferably more than 70%,
protein content is 10 to 25%,
fat content is less than 2.5%, preferably less than 1%,
volume-average particle size is 4 to 80 µm and at least 95% of the particles are between 1 and 800 µm.

The invention still further relates to an oat-based starch concentrate having the following characteristics:
its starch content is more than 80%,
protein content is less than 15%, preferably less than 10%,
fat content is less than 2.5%, preferably less than 1%,
volume-average particle size is 12 to 15 µm and at least 95% of the particles are between 1 and 210 µm.

The invention also relates to an oat-based protein concentrate having the following characteristics:

its protein content is more than 30%, preferably 50 to 80%, fat content is less than 5.0%, preferably less than 3%, volume-average particle size is about 1 to 5 µm and at least 95% of the particles are between 0.5 and 7 µm.

The above-described β-glucan, starch and protein concentrates are further characterized in that they are prepared from non-heat-treated or slightly heat-treated oat fat-extracted with a supercritical fluid by using mechanical dry methods selected from dry milling, sieving and air classification.

The invention also relates to a lipid-enriched oat oil containing more than 90% neutral fats that are mainly triglycerides. The invention also relates to a lipid-enriched oat oil containing more than 90% polar lipids comprising preferably 30 to 50% phospholipids and preferably 50 to 70% glycolipids. These lipid-enriched oat oils are obtained as a fat fraction from the extraction of non-heat-treated or slightly heat-treated oat with a supercritical fluid.

The thus obtained fatless or low-fat β-glucan, starch and protein concentrates are well preservable, since no gustatory detriment, typical of oat and caused by fat hydrolysis or oxidation, is formed therein. In addition, they are easy to dose and sieve (even with a 25-µm air jet sieve), in contrast to conventional, corresponding products prepared from oat. They also easily disperse in water. The products of the invention differ from products prepared by solvent-based wet methods in that part of the cell wall or tissue structure of the oat grain remains. In the food industry, the products are usable for various purposes, such as fibre supplements, expansion supplements, viscosity supplements and protein supplements.

The oat-based lipid concentrates of the invention find potential use in the food industry as emulsifiers, for example, and in cosmetics and medicine, particularly thanks to the polar lipids contained therein.

The invention thus also relates to the use of the β-glucan, starch, protein and lipid concentrates of the invention in foodstuffs, medicines and cosmetics.

In accordance with the invention, it was surprisingly found out that by using, as the starting material, non-heat-treated or slightly heat-treated oat extracted with supercritical $CO_2$ and/or a combination of $CO_2$ and EtOH in accordance with the invention the milling, sieving and air classification characteristics of the oat clearly improved. The method of the invention allowed β-glucan and starch, among others, to be enriched by dry methods and mechanical means to concentrations that have up to now not been reached without processes including water and solvents and using expensive drying operations.

In the method of the invention, the protein particles of the oat endosperm become detached from the starch in the endosperm during milling, from where they can be separated by classification as the finest and lightest fraction of the process. In the process, a protein-poor, almost fatless starch concentrate is simultaneously separated as a heavier fraction.

The invention thus also relates to the use of non-heat-treated or slightly heat-treated oat fat-extracted with supercritical $CO_2$ and/or $CO_2$/EtOH extraction for preparing β-glucan, starch and protein concentrates by mechanical dry methods selected from dry milling, sieving and air classification. The fat content of the fat-extracted oat is less than 3.5%, preferably less than 2.5%, more preferably less than 1%.

The following examples describe the invention without restricting it in any way. In the following examples, as in the above description of the invention and in the subsequent claims, the percentage values are given as percentages per weight.

Example 1

Supercritical Extraction of Oat

Non-heat-treated, peeled Aslak oat was processes into a scaly bran and extracted in two steps, first with $CO_2$ and then with a combination of $CO_2$ and EtOH in an extraction vessel for removing fat. Supercritical extraction conditions in the first and second steps were: temperature 70° C. and pressure 450 bar. When a combination of EtOH and $CO_2$ was used, the proportion of EtOH in the $CO_2$ flow was 8 to 10 weight-%. From the extraction, an oat fraction was obtained having a residual fat content of 1.5 to 2%. In addition, from the second extraction step, oat oil was obtained as the fat fraction that contained 20% phospholipids and 60% glycolipids. This oat oil contained 20% of the original fat of the oat.

The above-described supercritical extraction may be performed in a corresponding manner by using only $CO_2$ as the extraction fluid.

Example 2

Particle Size Distribution of Fat-Extracted and Subsequently Milled Oat with Different Millings Oat, fat-extracted in the manner described in Example 1, was milled with an Alpine UPZ 100 mill provided with different milling elements (sieve, pin mill or grinding disc equipment). The rotation speed of the mill rotor was 18,000 rpm in all millings.

The following table shows the size distributions of oat flakes extracted by supercritical extraction and milled with a Hosokawa-Alpine UPZ 100 mill when three different mill equipments are used.

| Mill equipment | Mean, µm | Median, µm | 95% confidence limit, µm |
| --- | --- | --- | --- |
| Sieve (0.3 mm) | 17.1 | 14.8 | 1.7-168.3 |
| Pin mill | 62.2 | 133.6 | 1.3-2 983 |
| Grinder disc | 21.6 | 16.9 | 1.0-455.1 |

The broadest particle size distribution was obtained with pin milling.

Example 3A

Effect of Heat Treatment on the Extraction Speed of Fat in Supercritical Extraction The effect of heat treatment on supercritical extraction was studied by performing supercritical extraction on non-heat-treated flaked oat in the manner described in Example 1 (=starting material according to the invention) and on industrially heat-treated and subsequently flaked oat (reference product). The industrial heat treatment was performed for at least 30 minutes at 18% humidity at a temperature of 100° C. prior to drying. The extraction fluid was $CO_2$ and extraction time 5 hours. During this time, the weight of the extraction batch dropped 10.8% because of the water discharged with the fat.

The results are presented in FIG. 1. The results of the FIGURE show that the extraction speed of fat during the first half an hour from the non-heat-treated oat according to the invention was 1.75-fold compared with heat-treated oat. Consequently, the extraction of fat significantly speeds up when non-heat-treated oat is used as the starting material in accordance with the invention.

Example 3B

Stability of Residual Fat in Non-Heat-Treated, Supercritically Extracted Oat Bran The following table shows the residual lipid composition of oat extracted in the manner described in Example 1 as such and incubated in water for 15 h.

| Lipids | After extraction, mg/g | After incubation in water, mg/g |
|---|---|---|
| Polar lipids | 6.13 | 5.67 |
| Triacylglycerols | 4.27 | 4.61 |
| Diacylglycerols | — | 0.59 |
| Free fatty acids | 0.57 | 1.11 |
| Total lipids | 10.97 | 11.98 |

The results of the table show that the lipids remaining in non-heat-treated oat after supercritical extraction are very stable.

Examples 4A to 4F

Milling and Classification of Fat-Extracted Oat

Example 4A (1) Oat, fat-extracted in the manner described in Example 1 with a combination of $CO_2$ and EtOH and having a fat content of 3.4%, was milled with a pin mill (Fritsch Pulverisette laboratory mill) provided with a 0.5 mm sieve, the rotation speed of the rotor being 20,000 rpm. The thus obtained powder was sieved (Buhler sieving machine Rüetsch 5034 Suhr, sieve size 132 μm). A coarse fraction having a β-glucan content of 24% remained on the sieve. The amount of the coarse fraction remained on the sieve was 23% of the feed.

(2) This coarse fraction was milled with an impact mill (pin mill) and air classified with a Larox desk classifier (TKK, Espoo). In the classifier, the powder was led tangentially into a vertical classifier chamber, from which an airflow was conveyed horizontally through the 1-cm centre aperture to a cyclone. Three controllers of the shape of a segment of a circle surrounded the aperture, and the fine fraction was conveyed through openings between these controllers through the centre aperture to the cyclone. The coarse fraction was discharged under the action of centrifugal force to a collector vessel at the bottom. The airflow was accomplished by means of a Nilfisk vacuum cleaner. The coarse fraction was a β-glucan concentrate having a β-glucan content of 37%, a protein content of 28%, a starch content of 10%, a fat content of 3.4%, and a volume-average particle size of 160 to 180, and the size of 95% of the particles was between 35 and 1,000 μm.

(3) Part of the fine fraction of the previous step was sieved with an air jet sieve (Hosokawa-Alpine) by using a sieve size of 25 μm into a coarse fraction and a fine fraction. The coarse fraction was a β-glucan concentrate having a β-glucan content of 52%, a protein content of 15%, a starch content of less than 16%, a fat content of less than 3%, and a volume-average particle size of 80 to 120 μm, and 95% of the particles were between 20 and 500 μm. This β-glucan concentrate was a light, almost white powder.

Example 4B (1) Oat, fat-extracted in the manner described in Example 1 and having a fat content of 2.8%, was milled with an Alpine UPZ 100 mill (18,000 rpm) by using a 0.3 mm sieve. A powder was obtained, the size of 95% of whose particles was between 1.7 and 168.3 μm.

(2) The thus obtained powder was classified with a British Rema Mini-Split classifier by using a rotation speed of 15,000 rpm (100% of the maximum rotation speed) and an airflow of 80 $m^3/h$ (37% of the maximum airflow). As a fine fraction, a starch concentrate was obtained, containing 24% protein and 1.5% β-glucan, 70% starch and 2% fat. The volume-average particle size of the fine fraction was 22 to 60 μm, and 95% of the particles were between 2 and 800 μm. Correspondingly, the coarse fraction had 16% protein and 12% β-glucan.

(3) In the same separation, an extremely fine fraction was conveyed past the cyclone of the classifier to the filter as a protein concentrate having a protein content of 55%. The volume-average particle size of this fraction was about 2 to 5 μm and that of 95% within the limits 1 to 7 μm (assessed by the Coulter-Counter method), and the corresponding number-average value was 1.3 to 4 μm. The starch content was 30% and the fat content 3%.

Example 4C (1) Oat, fat-extracted in the manner described in Example 1 and having a fat content of 2.8%, was milled with an Alpine UPZ 100 mill (18,000 rpm) by using a grinder disc. A powder was obtained, the size of 95% of whose particles was between 1.0 and 455.1 μm.

(2) The thus obtained powder was classified with a British Rema Mini-Split classifier at a rotation speed of 3,500 rpm (23% of the maximum rotation speed) and an airflow of 220 $m^3/h$ (100% of the maximum airflow). The coarse fraction obtained had a β-glucan content of 30% and a protein content of 29%. The corresponding fine fraction had a β-glucan content of 2.6%.

(3) The coarse fraction was re-milled with a pin mill and the powder was classified by air classification, the speed of the classifier wheel being 4,500 rpm (30% of the maximum rotation speed) and the airflow speed being 220 $m^3/h$ (100% of the maximum airflow), whereby a coarse fraction was obtained that had a β-glucan content of 40% and a protein content of 28%.

Example 4D (1) Oat, fat-extracted in the manner described in Example 1 and having a fat content of 2.5%, was milled with an Alpine UPZ 100 mill (18,000 rpm) by using a grinder disc. A powder was obtained, the size of 95% of whose particles was between 1.0 and 455.1 μm. Classification was performed with a British Rema Mini-Split classifier, the speed of the classifier wheel being 4,000 rpm (26% of the maximum rotation speed) and the airflow 220 m³/h (100% of the maximum airflow). The fine fraction obtained was classified anew with the same classifier, the speed of the classifier wheel being 15,000 rpm (100% of the maximum speed) and the speed of the airflow being 100% of the maximum airflow of the device. In the cyclone part of the device, a starch concentrate was obtained as a fine fraction, and it contained 83% starch, 1% protein and 1.3% fat. The volume-average particle size of the fraction was 12 to 15 μm and at least 95% of the particles were between 1.0 and 210 μm.

Example 4E

The volume-average particle size distribution within the limits of 95% of oatmeal obtained by air classification (British Rema Mini-Split classifier) and having a protein content of 24.4% and a β-glucan content of 1.5% was 1.3 to 21 μm (assessed by the Coulter-Counter method). The Brabender amylogram of this oatmeal with an 80 g batch rose to a high level, as can be seen from the following table:

|  | Starting viscosity | Peak viscosity | End viscosity |
| --- | --- | --- | --- |
| Oatmeal | 35 BU | 1,860 BU/92.5° C. | 500 BU/95° C. |
| Wheat flour | 20 BU | 520 BU |  |

Example 4F (1) Oat, fat-extracted in the manner described in Example 1 with a combination of $CO_2$ and EtOH and having a fat content of 1%, was milled with a Hosokawa-Alpine UPZ 100 mill with pin mill equipment (18,000 rpm). The powder was classified with a British Rema classifier at a rotation speed of 3,500 rpm (23% of the maximum speed) by using an airflow of 220 m³/h (100% of the maximum airflow). The coarse fraction, of which 17 weight-% was obtained, was milled yet twice and classified with a British Rema classifier (3,500 rpm, 220 m³/h). The yield of the coarse fraction obtained with the second classification was 10 weight-% of the feed and the beta-glucan content 35%. 95% of the volume-average particle size was within the range 70 to 750 μm.

The fine fraction of the first milling contained 82% starch and 12% protein and 1% fat.

The fine fraction obtained from the classification of the first pin milling was sieved with a Hosokawa-Alpine air jet sieve by using a sieve size of 25 μm. On the sieve remained a β-glucan concentrate having a β-glucan content of 52%, a protein content of 15%, a starch content of 5.1%, a fat content of 1.5% and a volume-average particle size of 80 to 120 μm, with 95% of the particles between 20 and 500 μm. This β-glucan concentrate was a light, almost white powder.

(2) Oat, fat-extracted in the manner described in Example 1 and having a fat content of 1%, was milled with a Hosokawa-Alpine UPZ 100 mill (15,000 rpm) by using a grinder disc. In the classification (4,000 rpm, 26% of the maximum speed and 220 m³/h, 100% of the maximum airflow), 60 weight-% was separated from the powder as a fine fraction having a β-glucan content of 0.9%, a protein content of 18.6% and a starch content of 73%. The fine fraction had a volume-average particle size of 12.5 μm, and 95% of the particles were between 1 and 176 μm.

In the classification of the above-obtained fine fraction into a coarse fraction and a fine fraction, the classification (14,000 rpm, 93% of the maximum speed and 220 m³/h, 100% of the maximum airflow) yielded a fine fraction containing 24.4% protein and 0.6% beta-glucan having a volume-average particle size of 4.8 μm, and 95% of the particles were between 1.3 and 21 μm.

Correspondingly, a starch concentrate was conveyed to the coarse part as a fine fraction having a starch content of more than 90%, a protein content of 1%, a fat content of less than 1% and a volume-average particle size of 12 to 15 μm, 95% of the particles being between 1 and 210 μm.

The protein content continued to increase as the particle size of the powder decreased. The protein content of the fine fraction that passed the cyclone and was conveyed to the filter was 78%. This fraction had a volume-average particle size of about 3 μm and 95% within the limits 0.6 to 7 μm.

The coarse fraction obtained from the first classification and having a weight portion of 40% of the starting material was milled and classified again in the same conditions, whereby the proportion of the fine fraction rose to 74 weight-%, the proportion of the coarse fraction falling to 26 weight-% of the starting material.

After classification, a coarse fraction comprising 26 weight % of the original material was re-milled by repeating the milling and classification steps of the coarse fraction thrice, the rotation speed of the mill being 18,000 rpm and by using a grinder disc. The rotation speed of the classifier was 3,500 rpm (23% of the maximum speed) and airflow 220 m³/h (100% of the maximum airflow). Combined, the fine fractions obtained from the three classifications contained 10% β-glucan with a yield of about 15% (calculated from the starting material). From the last classification, a coarse fraction was obtained with a yield of about 8% (calculated from the starting material). It had a beta-glucan content of 40% and a protein content of 28%.

From the combined fine fraction of the classification, containing 10% β-glucan, light cell wall material having a β-glucan content of 45%, a protein content of 22% and a starch content of 5%, was separated with a 40 μm air jet sieve, the yield being 80%.

Example 5

Characteristics of Non-Heat-Treated and Heat-Treated Oat in Milling

Oat, fat-extracted by the method of Example 1 either with $CO_2$ or with $CO_2$/EtOH, was milled by using a Bauermeister mill provided with a 0.5 mm sieve and milling resistors. Air classification was subsequently carried out with a Larox desk classifier (TKK, Helsinki). In this example, non-heat-treated or slightly heat-treated oat in accordance with the invention (less than 30 minutes at 95° C. at 16% humidity) was compared with a reference product, which was heat-treated oat (over 30 minutes at 85 to 100° C. at 18% humidity).

The results are presented in the following Table 1.

TABLE 1

|  | Angle of slide | "Bulk" weight, g/100 ml | Coarse fraction of 1st classification, % of 1st feed | Coarse fraction of 2nd classification, % of 1st feed |
| --- | --- | --- | --- | --- |
| Sample 1 | 40° | 41 | 9.4 | — |
| Sample 2 | 42° | 41.5 | 27 | 15 |

TABLE 1-continued

| | Angle of slide | "Bulk" weight, g/100 ml | Coarse fraction of 1$^{st}$ classification, % of 1$^{st}$ feed | Coarse fraction of 2$^{nd}$ classification, % of 1$^{st}$ feed |
|---|---|---|---|---|
| Sample 3 | 45° | 38 | 33 | 22 |
| Sample 4 | 38° | 34.6 | 7.1 | |

1) Non-heat-treated, $CO_2$—EtOH-extracted oat
2) Slightly heat-treated, $CO_2$-extracted oat
3) Heat-treated, $CO_2$-extracted oat
4) Heat-treated, $CO_2$—EtOH-extracted oat The results show that the aptitude for classification and the angle of slide correlate with each other. Non-heat-treated oat has better milling characteristics and a better aptitude for classification than heat-treated oat. In addition, the use of ethanol in fat extraction increases the aptitude for classification and other mechanical durability of oatmeal.

Example 6

Characteristics of Non-Heat-Treated and Heat-Treated Oat in Sieving

Non-heat-treated oat was extracted in the form of flaky bran with supercritical $CO_2$-EtOH-extraction for removing fat in the manner described in Example 1. The thus obtained fat-extracted oat having a fat content of 1.5 to 2% and a humidity of 10.1% was milled with an impact mill (Fritsch Pulverisette laboratory mill) provided with a 0.5-mm sieve, the rotor rotation speed being 20,000 rpm, and then sieved with a shaking sieve (Buhler sieving machine Rüetsch 5034 Suhr).

Heat-treated oat in the form of flakes was treated in the same manner with supercritical $CO_2$-EtOH-extraction and milled and sieved in the same manner.

The following table shows the sieving characteristics of non-heat-treated and heat-treated oat.

TABLE 2

| Sieve sizes, μm | Heat-treated oat on sieve, distribution-% | Non-heat-treated oat on sieve, g |
|---|---|---|
| more than 180 | 25.9 | 15.2 |
| 132 to 180 | 5.6 | 3.1 |
| 95 to 132 | 3 | 2 |
| 75 to 95 | 37 | 50 |
| less than 75 | 4 | 5 |

The results show that non-heat-treated oat is better sieved than heat-treated oat.

It is evident to a person skilled in the art that as technology advances, the basic idea of the invention may be implemented in a plurality of ways. The invention and its embodiments are thus not restricted to the above-described examples, but may vary within the scope of the claims.

The invention claimed is:

1. A method of preparing β-glucan, protein, starch and lipid concentrates from oat, comprising the steps of:
   (a) extracting non-heat-treated oat or oat treated at a temperature up to 100° C. and at a relative humidity at most 16% with supercritical $CO_2$, whereby a fat-extracted oat fraction and one or more fat fractions are obtained,
   (b) dry-milling the fat-extracted oat fraction by impact milling into oatmeal having such a particle size that at least 95% of the particles are between 1.0 and 3,000 μm calculated on the basis of the volume,
   (c) dividing the thus obtained oatmeal into a first coarse fraction and a first fine fraction, said first coarse fraction comprising a β-glucan concentrate having a β-glucan content of 30 to 50% and a fat content of less than 3.5%, and said first fine fraction comprising a starch concentrate having a starch content of more than 70%, and said division being performed by using one or more operations selected from sieving and air classification and, optionally, dry milling,
   (d) dividing said first fine fraction further by sieving or air classification into a second coarse fraction, a second fine fraction and a third fine fraction, said second coarse fraction comprising a β-glucan concentrate having a β-glucan content of 45 to 60% and a fat content of less than 2%, said second fine fraction comprising a starch concentrate having a starch content of more than 80%, and said third fine fraction comprising a protein concentrate having a protein content of more than 30% and up to 80%.

2. The method as claimed in claim 1, wherein the β-glucan concentrate obtained as the first coarse fraction has the following characteristics:
   protein content is 20 to 35%,
   starch content is at most 15%, and
   volume-average particle size is 160 to 280 μm, and at least 95% of the particles are within the range 35 to 1,000 μm.

3. The method as claimed in claim 1, wherein the starch concentrate obtained as the first fine fraction has the following characteristics:
   protein content is 10 to 25%,
   fat content is less than 2.5%, and
   volume-average particle size is 4 to 80 μm and at least 95% of the particles are between 1 and 800 μm.

4. The method as claimed in claim 1, wherein the β-glucan concentrate obtained as the second coarse fraction has the following characteristics:
   protein content is 15 to 25%,
   starch content is less than 20%, and
   volume-average particle size is 80 to 120 μm, and at least 95% of the particles are between 20 and 500 μm,
   it is a white powder.

5. The method as claimed in claim 1, wherein the starch concentrate obtained as the second fine fraction has the following characteristics:
   protein content is less than 15%,
   fat content is less than 2.5%, and
   volume-average particle size is 12 to 15 μm and at least 95% of the particles are between 1.0 and 210 μM.

6. The method as claimed in claim 1, wherein the protein concentrate obtained as the third fine fraction has the following characteristics:
   fat content is less than 5.0%, and
   volume-average particle size is 1 to 5 μM and at least 95% of the particles are between 0.5 and 7 μm.

7. The method as claimed in claim 1, wherein the fat fraction obtained from supercritical extraction comprises a lipid-enriched oat oil containing more than 90% neutral fats that comprise triglycerides.

8. The method as claimed in claim 1, wherein said method comprises a second step for supercritical extraction with $CO_2$ and ethanol.

9. The method as claimed in claim 8, wherein the fat fraction obtained from the second supercritical extraction comprises a lipid-enriched oat oil containing more than 90% polar lipids.

10. The method as claimed in claim 1, comprising using peeled oat in the form of bran or flakes as starting material in supercritical extraction.

11. The method as claimed in claim 1, wherein the fat content of the fat-extracted oat fraction obtained from supercritical extraction is less than 2%.

12. The method as claimed in claim 1, comprising performing steps (b) to (d) when the moisture of the oat is 9 to 12%.

13. The method as claimed in claim 1, comprising performing said division in step (c) by using air classification, the rotation speed of the air classifier being about 20 to 100% of the maximum rotation speed of the classifier and the airflow being 40 to 100% of the maximum airflow of the classifier.

14. The method as claimed in claim 1, comprising performing said division in step (c) by using sieving, the sieve aperture size being 20 to 150 μm.

15. The method as claimed in claim 1, comprising performing step (d) by using sieving performed as an air jet sieving by using a sieve aperture size of 20 to 100 μm.

16. The method as claimed in claim 1, comprising performing step (d) by using air classification, the rotation speed of the classifier being 2 to 100% of the maximum rotation speed of the classifier and the airflow of the classifier being 40 to 100% of the maximum airflow of the classifier.

17. The method as claimed in claim 1, comprising performing the separation of the third fine fraction in step (d) by using sieving, the sieve aperture size being 20 to 50 μm.

18. The method as claimed in claim 1, wherein the protein concentrate obtained as the third fine fraction has a protein content of 50 to 80%.

19. The method as claimed in claim 2, wherein the β-glucan concentrate obtained as the first coarse fraction has a starch content at most 10%.

20. The method as claimed in claim 3, wherein the starch concentrate obtained as the first fine fraction has a fat content less than 1%.

21. The method as claimed in claim 4, wherein the β-glucan concentrate obtained as the second coarse fraction has a starch content less than 10%.

22. The method as claimed in claim 5, wherein the starch concentrate obtained as the second fine fraction has a protein content less than 10% and a fat content less than 1%.

23. The method as claimed in claim 6, wherein the protein concentrate obtained as the third fine fraction has a protein content of 50 to 80% and a fat content less than 3%.

24. The method as claimed in claim 11, wherein the fat content is less than 1%.

25. The method as claimed in claim 12, wherein the moisture of the oat is 10 to 11%.

26. The method as claimed in claim 14, wherein the sieve aperture size is 25 to 50 μm.

* * * * *